US008129965B2

(12) United States Patent
Kao et al.

(10) Patent No.: US 8,129,965 B2
(45) Date of Patent: Mar. 6, 2012

(54) QUICK-START LOW DROPOUT REGULATOR

(75) Inventors: Shun-Hau Kao, Taipei County (TW); Mao-Chuan Chien, Taipei County (TW); Chih-Liang Huang, Taipei County (TW)

(73) Assignee: Advanced Analog Technology, Inc., Science-Based Industrial Park, Hsinchu (TW)

( * ) Notice: Subject to any disclaimer, the term of this patent is extended or adjusted under 35 U.S.C. 154(b) by 321 days.

(21) Appl. No.: 12/628,220

(22) Filed: Dec. 1, 2009

(65) Prior Publication Data

US 2010/0308781 A1 Dec. 9, 2010

(30) Foreign Application Priority Data

Jun. 3, 2009 (TW) ................................ 98118365 A

(51) Int. Cl.
*G05F 1/40* (2006.01)
*H02M 7/10* (2006.01)

(52) U.S. Cl. ........................... 323/273; 363/49; 323/901

(58) Field of Classification Search .................. 323/238, 323/268, 273, 280–284, 901, 908; 363/49; 327/539

See application file for complete search history.

(56) References Cited

U.S. PATENT DOCUMENTS

| | | | | |
|---|---|---|---|---|
| 5,552,697 | A * | 9/1996 | Chan | 323/282 |
| 6,118,263 | A * | 9/2000 | O'Neill et al. | 323/315 |
| 6,661,211 | B1 * | 12/2003 | Currelly et al. | 323/268 |
| 6,703,815 | B2 * | 3/2004 | Biagi | 323/280 |
| 6,956,429 | B1 * | 10/2005 | Elbanhawy | 327/541 |
| 7,495,422 | B2 * | 2/2009 | Mok et al. | 323/280 |
| 7,501,805 | B2 * | 3/2009 | Chen et al. | 323/282 |
| 7,545,126 | B2 * | 6/2009 | Su et al. | 323/273 |
| 7,612,549 | B1 * | 11/2009 | Kao et al. | 323/281 |
| 7,622,902 | B1 * | 11/2009 | Kao et al. | 323/276 |
| 7,710,091 | B2 * | 5/2010 | Huang | 323/280 |
| 7,714,552 | B2 * | 5/2010 | Gerber et al. | 323/273 |
| 7,852,054 | B2 * | 12/2010 | Kao et al. | 323/277 |
| 7,893,672 | B2 * | 2/2011 | Scoones et al. | 323/280 |
| 7,906,945 | B2 * | 3/2011 | Kao et al. | 323/238 |
| 7,919,954 | B1 * | 4/2011 | Mannama et al. | 323/272 |
| RE42,335 | E * | 5/2011 | Man et al. | 323/274 |
| 8,008,900 | B2 * | 8/2011 | Liu et al. | 323/271 |

* cited by examiner

*Primary Examiner* — Adolf Berhane
(74) *Attorney, Agent, or Firm* — Winston Hsu; Scott Margo

(57) ABSTRACT

A low dropout regulator includes an error amplifier, an N-type depletion MOSFET, a first switch, a second switch, a low-pass filter resistor, and a low-pass filter capacitor. By switching on both the first switch and the second switch, a voltage level of an output node at a negative input terminal of the error amplifier may be rapidly raised to be close to and lower than a voltage level of an input node at a gate of the N-type depletion MOSFET. Both the first switch and the second switch are then switched off immediately so that the voltage level of the output node is gradually raised to be equal to the voltage level of the input node through the low-pass filter resistor.

5 Claims, 3 Drawing Sheets

QUICK-START LOW DROPOUT REGULATOR

BACKGROUND OF THE INVENTION

1. Field of the Invention

The present invention relates to a low dropout regulator, and more particularly, to a quick-start low dropout regulator.

2. Description of the Prior Art

A conventional regulator is primarily used for generating a stable output voltage, which serves a stable voltage source of active elements or passive elements. However, while there are noises inside the regulator, preciseness of the regulator is significantly reduced. The noises are primarily brought by an input voltage source or elements within the regulator, where the noises from the elements within include flicker noises and thermal noises. For immunizing from the noises, a low dropout regulator is conventionally used for providing a stable voltage source. Since there is a significantly small voltage difference between the input voltage and the output voltage of the low dropout regulator, most of the above-mentioned noises are neutralized within the low dropout regulator.

Please refer to FIG. 1, which is a diagram of a conventional low dropout regulator 100. As shown in FIG. 1, the low dropout regulator 100 includes an input voltage source VIN, an output voltage source VOUT, a first error amplifier 110, a transistor 120, a reference voltage source 130, a second error amplifier 140, a first reference amplifier 150, a second reference amplifier 160, a low-pass filtering resistor 170, and a low-pass filtering capacitor 180. The low dropout regulator 100 primarily takes use of a low-pass filtering circuit, which is formed by the low-pass filtering resistor 170 and the low-pass filtering capacitor 180, to filter off the flicker noises within. However, since the low-pass filtering circuit is capable of filtering off most noises of the low dropout regulator 100, an operational rate of the low dropout regulator 100 is significantly affected by the low-pass filtering circuit; It is because that the low-pass filtering circuit produces a certain amount of delays itself, and a reaction rate of the low-pass filtering circuit is reduced by a charging/discharging time of the low-pas filtering capacitor 180.

Please refer to FIG. 2, which is a conventional low dropout regulator 200 acquiring a high operational rate. As shown in FIG. 2, the low dropout regulator 200 includes an error amplifier 210, transistors M7 and Q1, resistors R2, R3, and R10, a capacitor C6, and current sources 14 and 19. The low dropout regulator 200 has an input node at a node Vbgi shown in FIG. 2, and has an output node at a node Vbgo shown in FIG. 2 as well. A primary purpose of the low dropout regulator 200 lies in adjusting a voltage level at the node Vbgo to be close to a voltage level at the voltage Vbgi, under a condition that the voltage level at the node Vbgi is variable in correspondence to variations of an input voltage source. A voltage level at a node Vd, which is located at an intersection between resistors R2 and R3, is adjusted to a lower voltage level than the voltage level at the node Vbgi by voltage dividing performed by the resistors R2 and R3, i.e., a resistance of the resistor R2 is required to be much smaller than a resistance of the resistor R3.

Operations of the low dropout regulator 200 are described as follows. While the voltage level at the node Vbgi is high by following a corresponding voltage source having a high voltage level, and is assumed to be 0.74 volts, the voltage level at the node Vd becomes an intermediate voltage level, which is slightly lower than the voltage of the high voltage level at the node Vbgi and is assumed to be 0.7 volts. At this time, a voltage level at the positive input terminal of the error amplifier 210 is close to 0 volts, and a voltage level at the negative input terminal of the error amplifier 210 equals the intermediate voltage level, so that the transistor M7 implemented with a P-type MOSFET is switched on, and so that the voltage level at the node Vbgo may be gradually raised to the intermediate voltage level or slightly even higher with the aid of both the current source 19 and the switched-on transistor M7, for example, 0.7 volts or 0.72volts. Then, since the voltage level at the node Vbgo is higher than the voltage level at the node Vd, the error amplifier 210 outputs an output signal having a high voltage level so as to switch off the transistor M7, and so as to have the voltage level at the node Vbgo to be raised to close to the voltage level at the Vbgi with the aid of the resistor R10, instead of the current source 19 and the switched-on transistor M7. For example, the voltage level at the node Vbgo may be raised from 0.7 or 0.72 volts to 0.74 volts with the aid of the resistor R10.

During the operations of the low dropout regulator 200 shown in FIG. 2, the voltage level at the node Vbgo may be rapidly raised to be close to the voltage level at the node Vd with the aid of the current source 19, and may be restricted from being raised higher than the voltage level at the node Vbgi with the aid of the error amplifier 210. However, since the low dropout regulator 200 may adjust the voltage level at its output node to be close to the voltage level at its input node faster than the regulator 100 shown in FIG. 1, the low dropout regulator 200 also takes more elements and feedback structures so that larger circuit area or chip area is also required as a price in fabricating the low dropout regulator 200.

SUMMARY OF THE INVENTION

The claimed invention discloses a quick-start low dropout regulator. The low dropout regulator comprises an error amplifier, an N-type depletion MOSFET, a first switch, a second switch, a low-pass filtering resistor, and a low-pass filtering capacitor. The N-type depletion MOSFET has a source coupled to a negative input terminal of the error amplifier. The first switch has a first terminal coupled to a drain of the N-type depletion MOSFET, a second terminal coupled to an input voltage source, and a third terminal coupled to an output of the error amplifier. The second switch has a first terminal coupled to the source of the N-type depletion MOSFET, has a second terminal coupled to ground, and has a third terminal coupled to the output terminal of the error amplifier. The low-pass filtering resistor has a first terminal coupled to a gate of the N-type depletion MOSFET, and has a second terminal coupled to the negative input terminal of the error amplifier. The low-pass filtering capacitor has a first terminal coupled to the negative input terminal of the error amplifier, and has a second terminal coupled to ground. When an output signal generated at the output terminal of the error amplifier is at a high voltage level, the first switch is switched on so as to have the drain of the N-type depletion MOSFET be coupled to the input voltage source, and the second switch is switched on so as to have the source of the N-type depletion MOSFET be coupled to ground.

These and other objectives of the present invention will no doubt become obvious to those of ordinary skill in the art after reading the following detailed description of the preferred embodiment that is illustrated in the various figures and drawings.

DETAILED DESCRIPTION

The present invention discloses a low dropout regulator for enhancing defects of conventional low dropout regulators, for filtering off noises generated by the low dropout regulators, and for fulfilling a quick-start mechanism.

Figure 3:
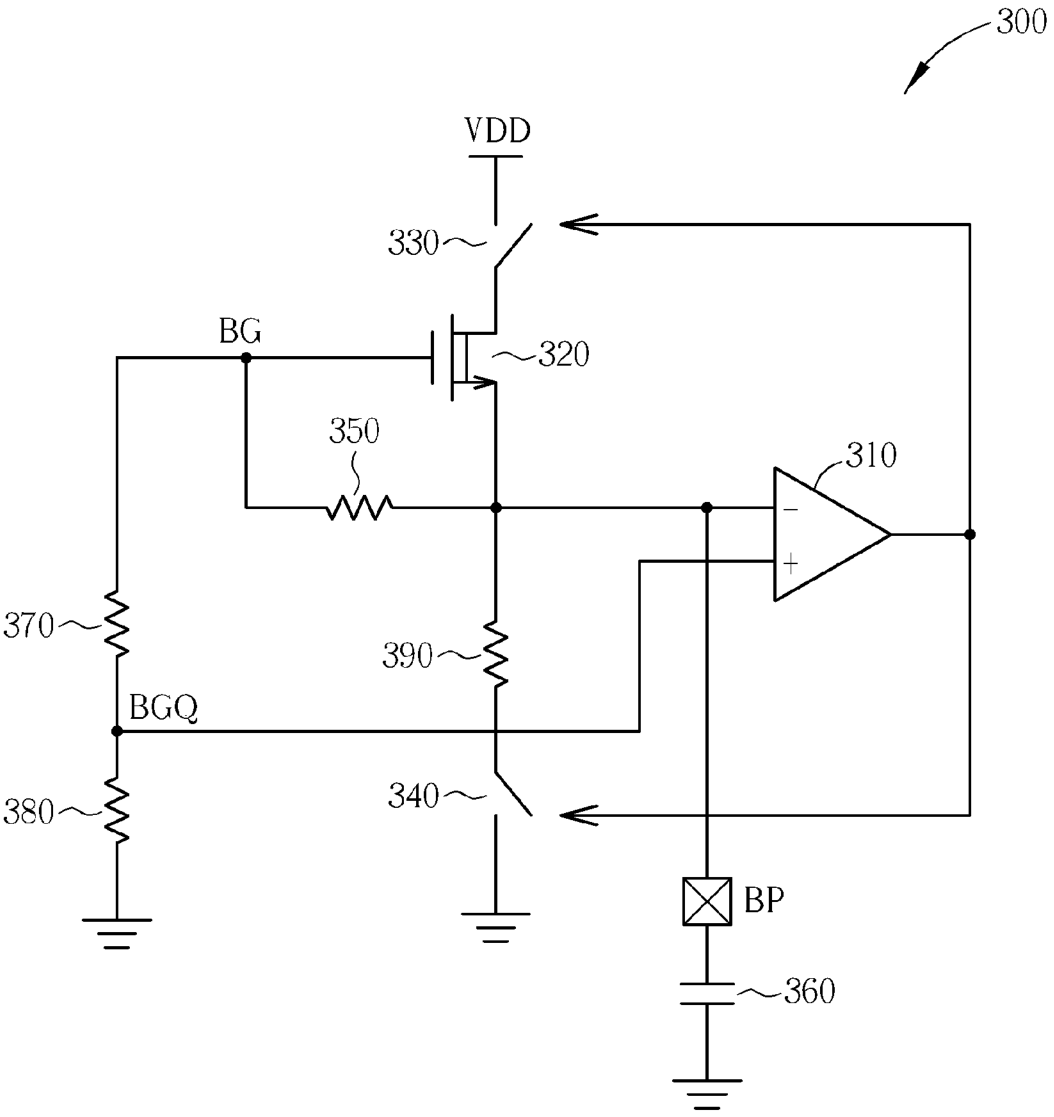
FIG. 3 is a diagram of a low dropout regulator disclosed in the present invention.

Please refer to FIG. 3, which is a diagram of a low dropout regulator 300 disclosed in the present invention. As shown in FIG. 3, the low dropout regulator 300 includes an error amplifier 310, a N-type depletion MOSFET 320, a first switch 330, a second switch 340, a low-pass filtering resistor 350, a low-pass filtering capacitor 360, a first voltage-diving resistor 370, a second voltage dividing resistor 380, and a resistor 390. The N-type depletion MOSFET 320 has a source coupled to a negative input terminal of the error amplifier 310. The first switch 330 has a first terminal coupled to a drain of the N-type depletion MOSFET 320, has a second terminal coupled to an input voltage source VDD, and has a third terminal coupled to an output terminal of the error amplifier 310. The resistor 390 has a first terminal coupled to the source of the N-type depletion MOSFET 320, and has a second terminal coupled to a first terminal of the second switch 340. The second switch 340 has a second terminal coupled to ground, and has a third terminal coupled to the output of the error amplifier 310. The low-pass filtering resistor 350 has a first terminal coupled to the gate of the N-type depletion MOSFET 320, and has a second terminal coupled to the negative input terminal of the error amplifier 310. The low-pass filtering capacitor 360 has a first terminal coupled to the negative input terminal of the error amplifier 310, and has a second terminal coupled to ground. The first voltage-dividing resistor 370 has a first terminal coupled to the gate of the N-type depletion MOSFET 320, and has a second terminal coupled to the positive input terminal of the error amplifier 310. The second voltage-dividing resistor 380 has a first terminal coupled to the second terminal of the first voltage-dividing 370, and has a second terminal coupled to ground.

Whether the first switch 330 or the second switch 340 is switched on or off is controlled by the output signal of the error amplifier 310, and both the first and second switches 330 and 340 are synchronous in respective switching states because of the output signal. While the output signal of the error amplifier 310 has a high voltage level, the first switch 330 is switched on so that the drain of the N-type depletion MOSFET 320 is electrically connected to the input voltage source VDD, and the second switch 340 is switched on so that the source of the N-type depletion MOSFET 320 is coupled to ground through the resistor 390. On the contrary, while the output signal of the error amplifier 310 has a low voltage level, the first switch 330 is switched off so that the drain of the N-type depletion MOSFET 320 is electrically disconnected from the input voltage source VDD, and the second switch 340 is switched off so that the source of the N-type depletion MOSFET 320 is electrically disconnected from ground. A signal at the node BG is an input signal of the low dropout regulator 300. A signal at the node BP is an output signal of the low dropout regulator 300. In other words, a purpose of the low dropout regulator 300 is to adjust a voltage level at the node BP to be equal to a voltage level at the node BG.

Figure 2:
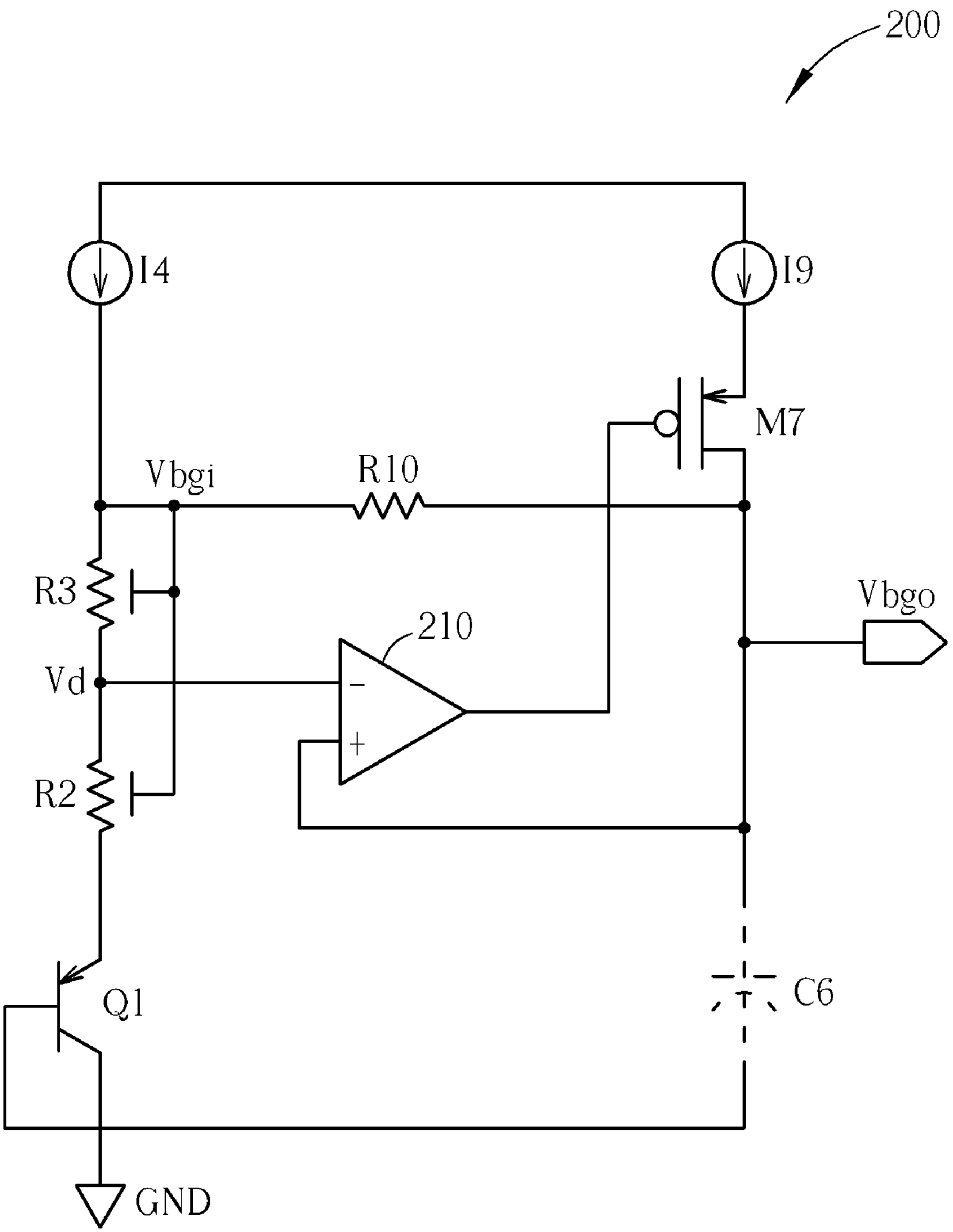
FIG. 2 PRIOR ART
FIG. 2 is a conventional low dropout regulator acquiring a high operational rate.

Note that in a preferred embodiment of the present invention, similar with the node Vd shown in FIG. 2, the node BGQ shown in FIG. 3 also has a voltage generated by using voltage-dividing resistors 370 and 380, so that the voltage at the node BGQ may not higher than but may be close to the voltage level at the node BG, by setting the resistance of the voltage-dividing resistor 370 to be much smaller than the resistance of the voltage-dividing resistor 380.

Operations of the low dropout regulator 300 are described as follows. First, an input voltage, which is assumed to be 0.74 volts, is inputted at the node BG shown in FIG. 3 so as to switch on the N-type depletion MOSFET 320. Since the voltage level at the node BGQ, which is assumed to be 0.7 volts, is not higher than but close to the voltage level at the node BG, and since the node BP has not been sufficiently charged, the voltage level at the node BGP is higher than the voltage level at the node BP so that the output signal of the error amplifier 310 is at a high voltage level. Both the first and second switches 330 and 340 are then switched on accordingly, so that the drain of the N-type depletion MOSFET 320 is electrically connected to the input voltage source VDD, and so that the source of the N-type depletion MOSFET 320 is electrically connected to ground through the resistor 390. The node BP, or the low-pass filtering capacitor 360, is then rapidly charged through the switched-on N-type depletion MOSFET 320 from the input voltage source VDD, until the voltage level at the node BP, for example, 0.7 or 0.72 volts, is not lower than the voltage level at the node BGQ. At this time, the output signal of the error amplifier 310 is changed to have a low voltage level, so that both the first and second switches 330 and 340 are switched off. As a result, the node BP may merely be charged to have a voltage level close to the voltage level at the node BG with the aid of both the node BG and the low-pass filtering resistor 350, and the aim of adjusting the voltage level at the node BP to close to the voltage level at the node BG may thus be fulfilled.

Note that the resistor 390 is used for preventing the node BP from being charged too rapidly and from being higher than the voltage level at the node BG, by extracting additional currents while the node BP is charged through the N-type depletion MOSFET 320 from the input voltage source VDD. Besides, if the N-type depletion MOSFET 320 is replaced with a N-type MOSFET, the voltage level at the node BP may not be raised to be close to the voltage level at the node BG since there is a cross voltage difference between the gate and the source of the N-type MOSFET. In other words, the N-type depletion MOSFET 320 is used for ensuring that the voltage level at the node BG is raised to be close to the voltage level at the node BG.

Figure 1:
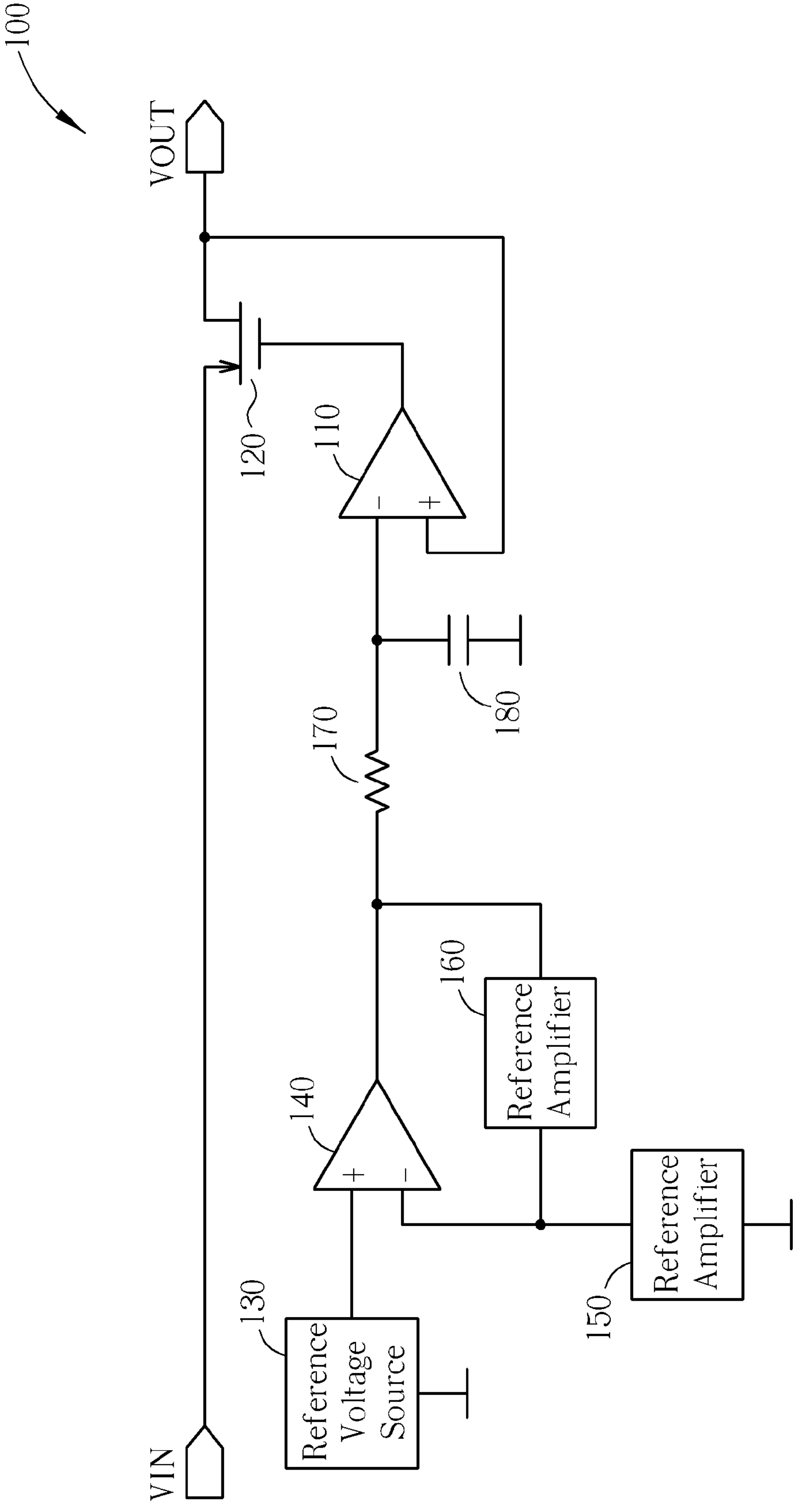
FIG. 1 PRIOR ART
FIG. 1 is a diagram of a conventional low dropout regulator.

In comparison of the regulators shown in FIG. 1 and FIG. 2, the low dropout regulator disclosed in the present invention is used for rapidly charging its output node with the aid of an N-type depletion MOSFET so as to overcome the tardy operational rate of the regulator shown in FIG. 1. Besides, the low dropout regulator disclosed in the present invention also uses fewer elements than the low dropout regulator shown in FIG. 2 so as to take less circuit area or chip area, and to reduce the capital in fabricating the low dropout regulator as a result.

Those skilled in the art will readily observe that numerous modifications and alterations of the device and method may be made while retaining the teachings of the invention.

What is claimed is:

1. A quick-start low dropout regulator, comprising:

an error amplifier;

an N-type depletion MOSFET having a source coupled to a negative input terminal of the error amplifier;

a first switch having a first terminal coupled to a drain of the N-type depletion MOSFET, a second terminal coupled to an input voltage source, and a third terminal coupled to an output of the error amplifier;

a second switch having a first terminal coupled to the source of the N-type depletion MOSFET, having a second terminal coupled to ground, and having a third terminal coupled to the output terminal of the error amplifier;

a low-pass filtering resistor having a first terminal coupled to a gate of the N-type depletion MOSFET, and having a second terminal coupled to the negative input terminal of the error amplifier; and a low-pass filtering capacitor having a first terminal coupled to the negative input terminal of the error amplifier, and having a second terminal coupled to ground;

wherein when an output signal generated at the output terminal of the error amplifier is at a high voltage level, the first switch is switched on so as to have the drain of the N-type depletion MOSFET be coupled to the input voltage source, and the second switch is switched on so as to have the source of the N-type depletion MOSFET be coupled to ground.

2. The low dropout regulator of claim 1 further comprising:

a first voltage-dividing resistor having a first terminal coupled to the gate of the N-type depletion MOSFET, and having a second terminal coupled to a positive input terminal of the error amplifier; and a second voltage-dividing resistor having a first terminal coupled to the second terminal of the first voltage-dividing resistor, and having a second terminal coupled to ground.

3. The low dropout regulator of claim 1, wherein when the output signal generated at the output terminal of the error amplifier is at a low voltage level, the first switch is switched off so as to have the drain of the N-type depletion MOSFET be electrically disconnected to the input voltage source, and the second switch is switched off so as to have the source of the N-type depletion MOSFET be electrically disconnected to ground.

4. The low dropout regulator of claim 1, wherein an input voltage is inputted to the gate of the N-type depletion MOSFET, and a voltage at the negative input terminal of the error amplifier is used as an output voltage of the low dropout regulator.

5. The low dropout regulator if claim 1, further comprising:

a resistor having a first terminal coupled to the source of the N-type depletion MOSFET, and having a second terminal coupled to the first terminal of the second switch.

* * * * *